(12) United States Patent
Haumont et al.

(10) Patent No.: US 7,023,825 B1
(45) Date of Patent: Apr. 4, 2006

(54) CONTROLLING QUALITY OF SERVICE IN A MOBILE COMMUNICATIONS SYSTEM

(75) Inventors: Serge Haumont, Helsinki (FI); Mikko Puuskari, Helsinki (FI); Tuomas Niemelä, Helsinki (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/763,001

(22) PCT Filed: Aug. 9, 1999

(86) PCT No.: PCT/FI99/00661

§ 371 (c)(1),
(2), (4) Date: Apr. 10, 2001

(87) PCT Pub. No.: WO00/10357

PCT Pub. Date: Feb. 24, 2000

(30) Foreign Application Priority Data

Aug. 10, 1998 (FI) ...................................... 981722

(51) Int. Cl.
*H04Q 7/24* (2006.01)

(52) U.S. Cl. .................. 370/338; 370/395.21; 370/392

(58) Field of Classification Search ................ 370/252, 370/312, 316, 329, 332, 338, 345, 473, 352–354, 370/395.4, 466, 469, 328, 351, 386, 392, 370/395.21, 395.42; 455/433, 436, 435.2, 455/442, 445, 450; 709/245
See application file for complete search history.

(56) References Cited

U.S. PATENT DOCUMENTS

| | | | | |
|---|---|---|---|---|
| 6,061,346 A | * | 5/2000 | Nordman | ..................... 370/352 |
| 6,104,929 A | * | 8/2000 | Josse et al. | .................. 455/445 |
| 6,236,656 B1 | * | 5/2001 | Westerberg et al. | ..... 370/395.4 |
| 6,256,498 B1 | * | 7/2001 | Ludwig | ....................... 455/433 |
| 6,320,873 B1 | * | 11/2001 | Nevo et al. | .................. 370/466 |
| 6,335,927 B1 | * | 1/2002 | Elliott et al. | ................. 370/352 |
| 6,377,804 B1 | * | 4/2002 | Lintulampi | ............... 455/435.2 |
| 6,400,954 B1 | * | 6/2002 | Khan et al. | .................. 455/450 |
| 6,532,227 B1 | * | 3/2003 | Leppisaari et al. | ......... 370/348 |
| 6,574,221 B1 | * | 6/2003 | Petersen | ................... 370/395.1 |
| 7,708,832 | * | 8/2003 | Forslow | ...................... 370/353 |
| 6,721,278 B1 | * | 4/2004 | Rimhagen et al. | .......... 370/252 |

FOREIGN PATENT DOCUMENTS

| | | |
|---|---|---|
| EP | 0855 820 | 7/1998 |
| JP | 10-200536 A | 7/1998 |
| WO | WO 97/36405 | 10/1997 |
| WO | WO 98/16036 A1 | 4/1998 |
| WO | WO 98/53576 | 11/1998 |
| WO | WO 99/05828 | 2/1999 |

* cited by examiner

*Primary Examiner*—Phirin Sam
(74) *Attorney, Agent, or Firm*—Pillsbury Winthrop Shaw Pittman LLP

(57) ABSTRACT

A method for transmitting data packets in multiple data flows to/from a mobile station in a mobile communications system. A data transmission path is formed for routing data packets. Multiple profiles are associated with the data transmission path, each profile comprising at least one quality of service parameter, or QoS parameter. Each flow or data packet is provided with a profile tag indicating one of the multiple profiles. Scheduling and policing the transmission of individual data packets is based on at least one QoS parameter of the profile indicated by the profile tag associated with the data flow in question.

18 Claims, 3 Drawing Sheets

CONTROLLING QUALITY OF SERVICE IN A MOBILE COMMUNICATIONS SYSTEM

BACKGROUND OF THE INVENTION

The invention relates to controlling Quality of Service (QoS) in mobile communications systems having a packet data transmission capability.

A mobile communications system refers generally to any telecommunications system which enables a wireless communication when users are moving within the service area of the system. A typical mobile communications system is a Public Land Mobile Network (PLMN). A mobile communications network is usually an access network providing a user with a wireless access to external networks, hosts, or services offered by specific service providers.

General packet radio service GPRS is a new service in the GSM system (Global system for mobile communications), and is one of the objects of the standardisation work of the GSM phase 2+ at the ETSI (European Telecommunications Standards institute). The GPRS operational environment comprises one or more subnetwork service areas, which are interconnected by a GPRS backbone network. A subnetwork comprises a number of packet data service nodes, referred to as serving GPRS support nodes SGSN, each of which is connected to the GSM mobile communications network (typically to base station systems BSS) in such a way that it can provide a packet service for mobile data terminals via several base stations, i.e. cells. The intermediate mobile communications network provides packet-switched data transmission between a support node and mobile data terminals. Different subnetworks are in turn connected to an external data network, e.g. to a public switched data network PSPDN, via GPRS gateway support nodes GGSN. The term GSN refers commonly to both SGSN and GGSN. The GPRS service thus allows providing packet data transmission between mobile data terminals and external data networks when the GSM network functions as an access network.

In order to access the GPRS services, a mobile station (MS) shall first make its presence known to the network by performing a GPRS attach. This operation establishes a logical link between the MS and the SGSN, and makes the MS available for Short Message Service (SMS) over GPRS, paging via the SGSN, and notification of incoming GPRS data. More particularly, when the MS attaches to the GPRS network, i.e. in a GPRS attach procedure, the SGSN creates a mobility management context (MM context). The authentication of the user is also carried out by the SGSN in the GPRS attach procedure. In order to send and receive GPRS data, the MS shall activate the packet data address that it wants to use, by requesting a PDP (Packet Data Protocol) activation procedure. This operation makes the MS known in the corresponding GGSN, and interworking with external data networks can commence. More particularly, a PDP context is created in the MS and the GGSN and the SGSN. The PDP context defines different data transmission parameters, such as the PDP type (e.g. X.25 or IP), PDP address (e.g. an X.121 address), quality of service QoS and NSAPI (Network Service Access Point Identifier). The MS activates the PDP context with a specific message, Activate PDP Context Request, in which it gives information on the Temporary Logical Link Identity (TLLI), PDP type, PDP address, required QoS and NSAPI, and optionally the access point name APN.

FIG. 1 illustrates a GPRS packet radio network implemented in the GSM system. For a more detailed description of the GPRS, reference is made to ETSI GSM 03.60, version 6.1.0, and the cross-references thereof.

The basic structure of the GSM system comprises two subsystems: a base station system BSS and a network subsystem NSS. The BSS and mobile stations MS communicate with each other over radio links. In the base station system BSS, each cell is served by a base station BTS. A number of base stations are connected to a base station controller BSC which controls the radio frequencies and channels used by the BTS. Base station controllers BSC are connected to a mobile services switching centre MSC. As regards a more detailed description of the GSM system, reference is made to the ETSI/GSM recommendations and *The GSM System for Mobile Communications*, M. Mouly and M. Pautet, Palaiseau, France, 1992, ISBN:2-957190-07-7.

In FIG. 1, the GPRS system connected to the GSM network comprises one GPRS network, which in turn comprises one serving GPRS support node (SGSN) and several GPRS gateway support nodes (GGSN). The different support nodes SGSN and GGSN are interconnected by an intra-operator backbone network. In the GPRS network there may be any number of serving support nodes and gateway support nodes.

The serving GPRS support node SGSN is a node which serves the mobile station MS. Each SGSN controls packet data service within the area of one or more cells in a cellular packet radio network, and therefore, each SGSN is connected (via a Gb interface) to a certain local element of the GSM system. This connection is typically established to the base station system BSS, i.e. to base station controllers BSC or to a base station BTS. The mobile station MS located in a cell communicates through the mobile communication network with a BTS over a radio interface and further with the SGSN to the service area of which the cell belongs. In principle, the mobile communication network between the SGSN and the MS only relays packets between these two. To achieve this, the mobile communication network provides packet-switched transmission of data packets between the MS and the SGSN. It has to be noted that the mobile communication network only provides a physical connection between the MS and the SGSN, and thus its exact function and structure are not significant with respect to the invention. The SGSN is also provided with a signalling interface Gs to the visitor location register VLR of the mobile communication network and/or to the mobile services switching centre, e.g. signalling connection SS7. The SGSN may transmit location information to the MSCNLR and/or receive requests for searching for a GPRS subscriber from the MSCNLR.

The GPRS gateway support nodes GGSN connect an operator's GPRS network to external systems, such as other operators' GPRS systems, data networks 11, such as an IP network (Internet) or an X.25 network, and service centres. A border gateway BG provides access to an inter-operator GPRS backbone network 12. The GGSN may also be connected directly to a private corporate network or a host. The GGSN includes GPRS subscribers' PDP addresses and routing information, i.e. SGSN addresses. Routing information is used for tunnelling protocol data units PDU from data network 11 to the current switching point of the MS, i.e. to the serving SGSN. The functionalities of the SGSN and GGSN can be connected to the same physical node.

The home location register HLR of the GSM network contains GPRS subscriber data and routing information and it maps the subscriber's IMSI into one or more pairs of the PDP type and PDP address. The HLR also maps each PDP type and PDP address pair into one or more GGSNs. The SGSN has a Gr interface to the HLR (a direct signalling connection or via an internal backbone network 13). The HLR of a roaming MS and its serving SGSN may be in different mobile communication networks.

An intra-operator backbone network 13, which interconnects an operator's SGSN and GGSN equipment can be implemented by means of a local network, for example, such as an IP network. It should be noted that an operator's GPRS network can also be implemented without the intra-operator backbone network, e.g. by providing all features in one computer.

An inter-operator backbone network enables communication between different operators' GPRS networks.

In order to send and receive GPRS data, the MS shall activate the packet data address that it wants to use, by requesting a PDP activation procedure. This operation makes the MS known in the corresponding GGSN, and interworking with external data networks can commence. More particularly, a PDP context is created in the MS and the GGSN and the SGSN.

As a consequence, three different MM states of the MS are typical of the mobility management (MM) of a GPRS subscriber: idle state, standby state and ready state. Each state represents a specific functionality and information level, which has been allocated to the MS and SGSN. Information sets related to these states, called MM contexts, are stored in the SGSN and the MS. The context of the SGSN contains subscriber data, such as the subscriber's IMSI, TLLI, location and routing information, etc.

In the idle state the MS cannot be reached from the GPRS network, and no dynamic information on the current state or location of the MS, i.e. the MM context, is maintained in the network. In the standby and ready states the MS is attached to the GPRS network. In the GPRS network, a dynamic MM context has been created for the MS, and a logical link LLC (Logical Link Control) is established between the MS and the SGSN in a protocol layer. The ready state is the actual data transmission state, in which the MS can transmit and receive user data.

In the standby and ready states, the MS may also have one or more PDP contexts (Packet Data Protocol), which are stored in the serving SGSN in connection with the MM context. The PDP context defines different data transmission parameters, such as PDP type (e.g. X.25 or IP), PDP address (e.g. an X.121 address), QoS and NSAPI. The MS activates the PDU context with a specific message, Activate PDP Context Request, in which it gives information on the TLLI, PDP type, PDP address, required QoS and NSAPI, and optionally the access point name APN. When the MS roams to the area of a new SGSN, the new SGSN requests MM and PDP contexts from the old SGSN.

As shown in FIG. 2, a GPRS system comprises layered protocol structures called planes for signalling and transmitting user information. The signalling plane consists of protocols for control and support of the transmission plane functions. The transmission plane consists of a layered protocol structure providing user information transfer, along with associated information transfer control procedures (e.g. flow control, error detection, error correction and error recovery). The Gb interface keeps the transmission plane of the NSS platform independent of the underlying radio interface.

The GPRS Tunnelling Protocol (GTP) tunnels user data and signalling between GPRS support nodes in the GPRS backbone network. All PDP-PDUs shall be encapsulated by the GTP. The GTP provides mechanisms for flow control between GSNs, if required. GTP is specified in GSM 09.60. The Transmission Control Protocol (TCP) carries GTP-PDUs in the GPRS backbone network for protocols that need a reliable data link (e.g., X.25), and the UDP carries GTP-PDUs for protocols that do not need a reliable data link (e.g. IP). The TCP provides flow control and protection against lost and corrupted GTP-PDUs. The user datagram protocol (UDP) provides protection against corrupted GTP-PDUs. The TCP is defined in RFC 793. The UDP is defined in RFC 768. The Internet Protocol (IP) is the GPRS backbone network protocol used for routing user data and control signalling. The GPRS backbone network may initially be based on the IP version 4 (IPv4) protocol. Ultimately, IP version 6 (IPv6) will be used. IP version 4 is defined in RFC791.

The Subnetwork Dependent Convergence Protocol (SNDCP) is a transmission functionality which maps network-level characteristics onto the characteristics of the underlying network. The SNDCP is specified in GSM 04.65. The Logical Link Control (LLC) provides a highly reliable ciphered logical link. The LLC shall be independent of the underlying radio interface protocols in order to allow introduction of alternative GPRS radio solutions with minimum changes to the NSS. The LLC is specified in GSM 04.64. The relay function relays LLC-PDUs between the Um and Gb interfaces in the BSS. In the SGSN, the relay function relays PDP-PDUs between the Gb and Gn interfaces. The Base Station System GPRS Protocol (BSSGP) conveys routing and QoS-related information between BSS and SGSN. The BSSGP is specified in GSM 08.18. The Frame Relay layer transports BSSGP PDUs. RLC/MAC layer contains two functions: The Radio Link Control function provides a radio-solution-dependent reliable link. The Medium Access Control function controls the access signalling (request and grant) procedures for the radio channel, and the mapping of LLC frames onto the GSM physical channel. RLCIMAC is described in GSM 03.64.

FIG. 1 also shows the structure of a data packet DP. It comprises a payload PL carrying actual user information, and a number of headers H for identification, routing and priority information, etc. Each protocol layer adds a header of its own to the data packet. The item PrT will be explained later.

Various identities are employed in the GPRS. A unique International Mobile Subscriber Identity (IMSI) shall be allocated to each mobile subscriber in GSM. This is also the case for GPRS-only mobile subscribers. A GPRS subscriber, identified by an IMSI, shall have one or more temporarily and/or permanently associated network layer addresses, i.e. PDP addresses which conform to the standard addressing scheme of the respective network layer service used. A PDP address may be an IP address or an X.121 address. PDP addresses are activated and deactivated through SM (session management) procedures.

The NSAPI and TLLI are used for network layer routing. A NSAPI/TLLI pair is unambiguous within a given routing area. In the MS, the NSAPI identifies the PDP service access point (PDP-SAP). In the SGSN and the GGSN, the NSAPI identifies the PDP context associated with a PDP address. Between the MS and the SGSN, the TLLI unambiguously identifies the logical link. NSAPI is a part of the tunnel identifier (TID). TID is used by the GPRS tunnelling protocol between GSNs to identify a PDP context. A TID consists of an IMSI and an NSAPI. The combination of IMSI and NSAPI uniquely identifies a single PDP context. The TID is forwarded to the GGSN upon PDP Context activation and it is used in subsequent tunnelling of user data between the GGSN and the SGSN to identify the MS's PDP contexts in the SGSN and GGSN. The TID is also used to forward N-PDUs (network-level Packet Data Units) from the old SGSN to the new SGSN at and after an inter-SGSN routing update.

Each SGSN and GGSN have an IP address, either of type IPv4 or IPv6, for inter-communication over the GPRS backbone network. For the GGSN, this IP address corresponds also to a logical GSN name.

The GPRS transparently transports PDP-PDUs between external networks and MSs. Between the SGSN and the GGSN, PDP-PDUs are routed and transferred with the IP protocol. The GPRS Tunnelling Protocol GTP transfers data through tunnels. A tunnel is identified by a tunnel identifier (TID) and a GSN address. All PDP-PDUs are encapsulated and decapsulated for GPRS routing purposes. Encapsulation functionality exists at the MS, at the SGSN, and at the GGSN. Encapsulation allows PDP-PDUs to be delivered to and associated with the correct PDP context in the MS, the SGSN, or the GGSN. Two different encapsulation schemes are used; one for the GPRS backbone network between two GSNs, and one for the GPRS connection between a SGSN and an MS.

Between an SGSN and a GGSN, the GPRS backbone network encapsulates a PDP-PDU with a GPRS Tunnelling Protocol header, and it inserts this GTP-PDU in a TCP-PDU or UDP-PDU that again is inserted in an IP-PDU. The IP and GTP-PDU headers contain the GSN addresses and tunnel endpoint-identifiers necessary to uniquely address a GSN PDP context.

Between an SGSN and an MS, a PDP context is uniquely addressed with a TLLI/NSAPI pair. The TLLI is assigned when the MS initiates the Attach function. NSAPIs are assigned when the MS initiates the PDP Context Activation function.

Quality of service (QoS) defines how the packet data units (PDUs) are handled during transmission through the GPRS network. For example, the QoS defined for the PDP addresses control the order of transmission, buffering (the PDU queues) and discarding of the PDUs in the SGSN and the GGSN, especially in a congested situation. Therefore, different QoS levels will present different end-to-end delays, bit rates and numbers of lost PDUs, for example, for the end users.

A QoS profile is associated with each PDP Address. For example, some PDP addresses may be associated with e-mail that can tolerate lengthy response times. Other applications cannot tolerate delay and demand a very high level of throughput, interactive applications being one example. These different requirements are reflected in the QoS. If a QoS requirement is beyond the capabilities of a PLMN, the PLMN negotiates the QoS as close as possible to the requested QoS. The MS either accepts the negotiated QoS or deactivates the PDP context.

Currently, a GPRS QoS profile contains five parameters: service precedence, delay class, reliability, and mean and peak bit rates. Service precedence defines some kind of priority for the packets-belonging to a certain PDP context (i.e. which packets will be dropped in case of congestion). Delay class defines mean and maximum delays for the transfer of each data packet belonging to that context. Reliability in turn specifies whether acknowledged or unacknowledged services will be used at LLC (Logical Link Control) and RLC (Radio Link Control) layers. In addition, it specifies whether protected mode should be used in case of unacknowledged service, and whether the GPRS backbone should use TCP or UDP to transfer data packets belonging to the PDP context. Furthermore, these varying QoS parameters are mapped to four SAPIs (Service Access Point Identifiers) available at the LLC layer.

The GPRS network is not capable of meeting the various QoS requirements of Internet applications. IP (Internet Protocol) traffic takes place between a mobile host and a fixed host located in an external network, e.g. in the Internet. Different Internet applications require different kinds of service, i.e. QoS, from the underlying network. Thus, when the mobile host is using GPRS to access the Internet, the GPRS network should be capable of meeting various QoS requirements of Internet applications. There are actually at least two IP traffic types that should be taken into account: real-time and non-real-time traffic. One example of real-time traffic is voice transmission. E-mail and file transfer in turn are examples of non-real-time applications.

Currently, QoS parameters can only be associated with a certain PDP context (i.e. a certain IP address, if the PDP type is IP). Therefore, setting different QoS values for different applications that use the same IP address is not possible. This is a very severe drawback of the current QoS scheme. The current GPRS specifications also define only very static QoS behaviour: A mobile station can only initiate a QoS negotiation when activating the PDP context. To summarise the main problems: The GPRS QoS scheme is too static, i.e. the QoS cannot be changed by the MS or the GGSN after the QoS has been negotiated for the first time, and moreover, all applications that use the same IP address must also use the same QoS profile, i.e. the QoS values. This is obviously not sufficient for supporting the requirements of various Internet applications and traffic streams, such as voice transmission, real-time video, compressed video, e-mail transfer, file transfer, and high priority control information exchange.

The Internet includes at the moment two different QoS schemes: Integrated Services and Differentiated Services. Integrated Services consist of three traffic types: Guaranteed Service, Controlled Load Service, and Best-Effort Service. Guaranteed Service is very difficult to provide without introducing a large amount of overhead to the system. The reason for this overhead is that end-to-end traffic flows should be established for different application connections. Therefore, this requires large amounts of database management, control information exchange, and traffic policing of the system. Controlled Load provides unloaded network behaviour even under congested situations. Controlled Load can be implemented by means of priorities. Therefore, implementing Controlled Load Service would probably be easier than Guaranteed Service, which needs strict guarantees on transmission delays etc. Best-Effort Service does not need any guarantees on the QoS, and is thus very easy to implement in any network.

Differentiated Services in the Internet are based on the idea that no data flows are needed, but instead every data packet carries QoS information itself. This allows a very flexible and easy way to provide a certain QoS to the applications. The drawback is that the capacity cannot be fully guaranteed because no fixed capacity is ever allocated to a certain application flow.

However, this scheme is much more efficient from the capacity and system point of view than the Integrated Services scheme.

Similar problems as described above may arise in any mobile communications network.

SUMMARY OF THE INVENTION

An object of the present invention is to introduce a new and improved Quality of Service (QoS) scheme which is more flexible than the prior art QoS schemes in mobile communications systems having a packet data transmission capability.

Another object of the present invention is a new QoS scheme which provides support for Internet applications and their QoS requirements for mobile communications systems having a packet data transmission capability.

The objects of the invention will be attained by the method and equipment which are characterized by what is disclosed in the attached independent claims. Preferred embodiments of the invention are disclosed in the attached dependent claims.

According to the invention, in connection with (i.e. during or after) PDP context activation, a mobile station MS may activate more than one QoS profile within the PDP context. In other words, an active PDP context for an MS comprises several QoS profiles. Transmitted packets are equipped with a profile tag or profile indicator indicating which profile the packet relates to. This profile tag is preferably 2, 3 or 4 bits in length, i.e. 4, 8 or 16 different profiles per context.

When the MS begins to execute a new application requiring different service which cannot be provided by the existing profiles (i.e. one which has not been used during this session) a corresponding profile must be defined in the SGSN. For example, the MS could indicate that FTP requires profile 2, H323 requires profile 3, etc. Alternatively, this information can be configured manually or by some external signalling methods, e.g. QoS profile establishment procedure or RSVP (Resource Reservation Protocol) signalling.

According to a simple embodiment of the invention, the prior art single profile for the PDP context is replaced with multiple profiles, one for each application, application type, or data flow, or aggregate for several flows. These multiple profiles are referred to as flow-related profiles, or simply flow profiles. According to a preferred embodiment, there is provided a hybrid between the prior art single profile and the concept of separate flow profiles provided by the simple embodiment (i.e. one profile for each application, type or flow) This hybrid consists of one MS-related profile and several application-related flow profiles. The hybrid-profile concept is based on the idea that some QoS parameters characterise the MS's maximum capabilities (such as a maximum bit rate on the R reference point between an MT and a TE) or its user's maximum rights (such as a maximum allowed rate or user importance: first class, business, etc.) Such maximum capabilities or rights are preferably defined in a common MS-related profile. If one of the flow profiles lacks a parameter, then the corresponding parameter of the MS-related profile (i.e. the value common to all profiles) is used. Alternatively, there could be a default QoS profile for some or all PDP contexts and/or default values for the QoS profile(s).

Typical parameters for the flow profiles are reliability, peak bit rate, mean bit rate, precedence and delay class (the latter may indicate real-time characteristics of a particular flow, hence it may be different for each flow).

Instead of indicating a profile directly, a packet may indicate a mapping to an external QoS (Resource Reservation Protocol, RSVP, or IP differentiated services). For example, a mobile station, when receiving an RSVP request, could add a QoS profile (such as profile 4) for RSVP whereby all RSVP packets will be encapsulated in GTP packets indicating profile 4 and they will be carried on the LLC layer of the appropriate SAPI. 'Appropriate' means that there is a certain QoS associated or preconfigured with each SAPI value. In other words, a QoS profile should be mapped to the right SAPI (four-level QoS value. This implies that the peak throughput can be defined on a per-MS basis (instead of on a profile basis). Peak throughput could also be defined for both the MS in question and each flow (or some of them). Then neither the traffic per flow nor the MS's total traffic could exceed the corresponding negotiated peak throughput. New QoS profiles can be established or triggered by RSVP signalling, parameter negotiation, tag allocation procedures or predefined on an per-application basis.

Internet applications are typically asymmetric, i.e. uplink and downlink flows have different QoS requirements. For example, in video-on-demand applications, video games, etc., the uplink traffic is typically a signalling link which requires reliable transmission but does not have any strict delay requirements. The corresponding downlink traffic is downloaded video information having just the opposite requirements: it has an upper limit on delay but missed frames can be ignored without undue harm. Two parameter sets have to be negotiated (either as separate QoS profiles for uplink and downlink, or a QoS profile includes two separate values for uplink and downlink).

The invention enables virtually any number of QoS profiles to be used simultaneously, e.g. a dedicated QoS profile for each of several Internet user applications being executed in the mobile station with the same IP address. (An n-bit profile tag can distinguish between $-2^n$ different profiles.) Therefore, the present invention provides support for various Internet applications and their QoS requirements using only one IP address, which is not possible using the current QoS scheme of the GPRS. Moreover, if a QoS profile has to be renegotiated, the same profile tag can still be used. This overcomes the problems relating to the static prior art QoS schemes. Further, the present invention introduces little overhead into the mobile communications system as a whole.

Implementing the invention involves some new issues. One of them is how the edges of the network can map the packets from the correct flow or profile. According to one possible solution, a process in the TE/MT/MS and GGSN (or some other node) manages the flow/profile associations and keeps track of which flows relate to which applications (or higher-level QoS schemes/aggregated flow, such as RSVP). This process can indicate these associations to the TE/MT/MS by providing each packet with a flow/profile tag which the MS uses to perform policing and scheduling and to forward the packet using the proper means (LLC acknowledged or unacknowledged). In this context, 'proper means' implies e.g. an appropriate LLC link using a particular SAPI/QoS value (mapping to underlying layers based on the negotiated QoS profile values and using the reserved capacity for the profile flow). Alternatively, the TE can use some other means and the MS can add the profile tag based on that information. The TE/MT/MS in turn forwards the profile tag in each packet it transmits.

At the edges of the network (such as at the MS and the GGSN), a process may analyse every incoming packet and deduce to which flow/profile a given packet is associated and inserts the corresponding profile tag in the packet. This analysis and deduction can be based on an IP priority field (ToS or DS in IPv4; Traffic class or DS in IPv6), source and destination addresses, TCP/UDP port numbers, or an RSVP flow (a flow is identified by its IP address and port number). Both edges must maintain a table linking the profile tag to the corresponding applications (or higher-level QoS schemes). The edge which establishes a new profile association must signal the association to the other edge. The mechanism for this kind of signalling can be GPRS-specific mechanisms or some other suitable mechanism, such as RSVP carried across GPRS and mapped to GPRS-specific signalling means (i.e. a new QoS profile establishment procedure).

The TE in the MT may use AT commands to signal the mapping information to the MS and the network, e.g. appropriate mapping between the profile tag and TCP/UDP port numbers. After this and the profile establishment operation, each packet could be mapped to the flow and the correct QoS profile corresponding to the port number in both the GGSN and the MS. Also, some QoS profiles may be pre-established for carrying e.g. data packets related to certain applications/port numbers.

The GTP uses flow labels which are defined in RFC-1883 as a mechanism to enable a source to label those packets for which it requests special handling by the IPv6 routers, such as non-default QoS or real-time service. In a network using GTP, the flow label could be used to carry the profile tags to indicate which flow and QoS profile a packet is associated with. It is also conceivable that multiple flows are used for each PDP context and the packets carry not only a flow identifier but also other associated QoS parameters. For example, in GPRS the precedence could be indicated per packet, whereby it is not part of the QoS profile, or it overrides that value of the flow. However, the QoS profile of the flow might still include a default value for the precedence. Such parameters could be set by the edge of the network in order to map the external QoS parameter (in this case, IP priority), or because more traffic than negotiated is transferred and additional packets might be marked. Such marking is analogous to using a discard bit. Alternatively, a suitable tag could be inserted into SNDCP and GTP headers.

The invention facilitates dynamic renegotiation. The QoS parameters associated with each flow can be renegotiated at any time without affecting other flows. Such renegotiation can be initiated by either edge of the network, or by an intermediate node. Additionally, should the need arise, the edges can also renegotiate a new mapping to external-parameters or a port number.

Negotiating and renegotiating a QoS profile can involve all parameters included in the profile, a subset of the parameters, or a QoS class (e.g. a bit vector or an integer value). The possible QoS class value could indicate, and also define, values for independent parameters. In other words, well-defined relations exist between the class and the independent parameters. The classes could be defined in some ranking order A, B, etc. so that the negotiation can be performed in one step as with LLC and SNDCP parameters. This requires that if a network element supports class A, it must also support all classes below it, i.e. B, C, etc. The QoS profile in the negotiation should be replaced by a QoS class field which is only 4 to 8 bits (16 to 256 different classes). This could be simplified by requiring that peak and mean bit rates are always MS-specific (not flow-specific). If such a requirement is considered too restricting, an additional field or two fields could be used for bitmaps indicating that a given class number in the (re)negotiation has a peak/mean bit rate combined with an MS-specific value. Yet another alternative is to separate the peak/mean bit rate from the classes and define them as an MS-specific parameter which is negotiated separately from the classes.

At both edges of the network, when a new external QoS reservation request (e.g. an RSVP PATH message) arrives, a process decides whether a new flow should be established or an existing flow reused (modified, if necessary) in order to limit the number of simultaneous flows. One flow should be the default flow to which packets are associated if they do not include flow identifiers.

Policing of packets can be performed on the LLC or SNDPC layers. It could be performed on a per-MS basis or on a per-class or per-context basis. Policing should be performed for N-PDUs because charging counts N-PDUs. Scheduling of packets can be performed on the BSSGP layer because it sees cell-specific pipes and retrieves traffic related to several MSs. The scheduling algorithm should take into account the delay and precedence defined in the QoS profile in question (user priority). Admission control should consider the total load and calculate/decide what bit rates can be allocated to an individual MS. This can be summarised as follows: A process on the SNDPC layer polices the flow and forwards the packets which pass the policer across the LLC layer to the scheduler on the BSSGP layer. The scheduler sends the packets to the BSS, or discards them in an overload situation. In connection with a flow/profile establishment, admission control calculates, on the basis of the total load situation which bit rates can be guaranteed to a given flow.

According to a preferred embodiment of the invention the profile indicated by the profile tag associated with each data packet includes at least priority information and delay requirements. The delay class information has two or more values indicating the importance of the packet and thus also defines the order in which data packets should be handled. In other words, it defines a dropping preference to be used in case of network congestion. The priority information may also define a Nominal Bit Rate as in what is known as an SIMA approach (Simple Integrated Media Access, see example 1 below). At least two traffic types having different delay requirements can be distinguished: real-time and non-real-time traffic. For example, for non-real-time traffic types, the following subtypes could be distinguished: control traffic, interactive traffic, attended bulk transfer, unattended data transfer, filler traffic, uncharacterised traffic, and best-effort traffic. They can be indicated by using different delay class values for each type. The traffic type has an impact on retransmission strategies and data queuing in the network. For example, for real-time traffic, retransmission of lost data packets is usually not needed, and it is often better to drop real-time data packets than to send them too late to the receiver.

According to another embodiment of the invention, instead of, or in addition to employing reliability at a PDP context level, as is currently done in the prior art, reliability is also directly associated with the profile associated with the data packet. The communications network, e.g. at the LLC layer, is arranged to provide different connections, each of which is associated with different reliability and QoS support. These connections may be provided in any one or several legs in the mobile communications network, e.g. at the radio interface and/or in a transmission link between two nodes in the network. One connection may be a connection oriented path having a higher reliability due to a retransmission protocol, for example, and another connection may be a connectionless path (e.g. using UDP) having a lower reliability. Data packets are multiplexed over these connections based on the reliability and QoS information associated with the profile in question (i.e. included in the QoS profile or indicated by the packet). The flows identified by the QoS profile tag requiring reliable transmission should be sent over a reliable connection-oriented path. The packets in flows that do not require a reliable connection-oriented path should be sent over a connectionless path. Both the connection-oriented and the connectionless paths can be established to transfer packets of only one PDP context or they can be used by several PDP contexts. Furthermore, the establishment of different paths with different reliability properties can be dynamic or static (i.e. on demand or when the tunnel (PDP context) is created). This concept of the invention may applied in any packet data communications network, even in one not using any PDP context, such as TCP/IP, ATM, or X.25 networks.

As noted above, the PDP context defines a kind of a transmission tunnel with specific characteristics through a mobile communications network. As in conventional networks, the parameters of the PDP context may include a PDP type (e.g. X.25 or IP), a PDP address (e.g. IP address), and an NSAPI. The PDP context may also optionally include one or more QoS parameters. For example, a mean and a peak bit rate for the whole PDP context can be used. The QoS of the PDP context may also include reliability. If both the PDP-level QoS profile and an additional QoS profile are to be used, the traffic policing may partly be based on the QoS values related to the PDP context, e.g. on the mean and peak bit rates. Therefore, if the user is sending at too high a speed, the priority of his or her data packets of certain flows could be temporarily decreased by the system. This guarantees that packets not conforming to the PDP level QoS contract are discarded first if needed. In addition, QoS information in the additional QoS profiles within the PDP context could be relevant only within the PDP context in question. This being the case, the QoS profile of a certain flow is taken into account only in relation with the global default QoS Profile of the PDP context.

A further feature of the present invention may be a mapping of the QoS parameters used in the mobile-communication network to those used in a user application in said mobile packet data terminal or those used in an external communication system, and vice versa. The mapping is performed for each packet entering or leaving the mobile communications system.

The profile tag in the data packets may be located in a packet header, in a lower layer protocol header, or as part of the data itself. The QoS controlling may also be based on the QoS information in the QoS profile which is related to a certain PDP context, the priority and traffic type information included in the data packets, or both.

One embodiment of the invention involves also charging of the users. Users can be charged, in addition to the normal PDP level attributes, according to the attributes in independent QoS profiles. This requires that the mobile communications network nodes, such as the GSNs in the GPRS, collect information on the transferred data packets and the corresponding flows/profiles. On the other hand, the invention also allows charging schemes using the normal PDP-level attributes, such as the mean and peak bit rates of the PDP context, or a combination of these schemes.

According to a further preferred embodiment of the invention, the mobile communications network is a packet radio network, such as the General Packet Radio Service (GPRS) of GSM or its evolution in the UMTS system. The present invention may also be implemented in a proprietary way: GPRS QoS profile will still be used.

This invention can also be applied to various future mobile networks, such as UMTS.

BRIEF DESCRIPTION OF THE SEVERAL VIEWS OF THE DRAWING

In the following, the invention will be described in greater detail by means of preferred embodiments with reference to the accompanying drawings, in which.

DETAILED DESCRIPTION OF THE INVENTION

Figure 1:
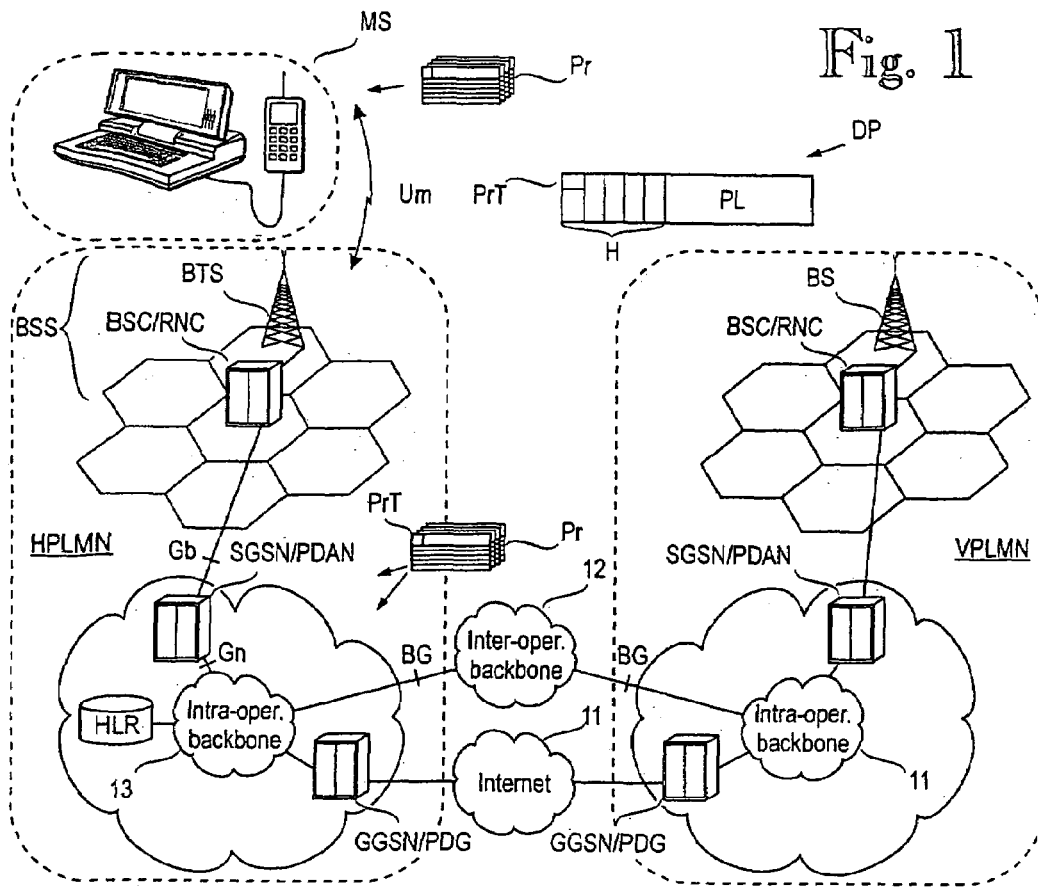
FIG. 1 illustrates a GPRS network architecture.

As shown in FIG. 1, the present invention can be applied to any mobile communications system having a packet data transmission capability.

The term 'packet data protocol' (PDP) or 'PDP context' as used herein should be understood to generally refer to any state in a mobile station and in at least one network element or functionality, which state provides a data packet transmission path or a tunnel with a specific set of parameters through the mobile communications network. The term 'node' as used herein should be understood to generally refer to any network element or functionality which handles the data packets transferred through the PDP channel.

The invention can be especially preferably used for providing a general packet radio service GPRS in the pan-European digital mobile communication system GSM or in corresponding mobile communication systems, such as DCS1800 (also known as GSM1800) and PCS (Personal Communication System). In the following, the preferred embodiments of the invention will be described by means of a GPRS packet radio network formed by the GPRS service and the GSM system without limiting the invention to this particular packet radio system.

A prior art data packet DP consists of a payload part PL and various headers H, one for each protocol layer. According to the invention, the mobile station MS and the support nodes SGSN, GGSN, etc. maintain multiple profiles Pr, each profile being tagged with a profile tag PrT. Each data packet DP also comprises a profile tag PrT indicating the relevant one of the multiple profiles Pr. Most protocols use headers where some bits are unused, redundant or reserved for further use. Such spare bits can be used for indicating the profile tag PrT, since typically only 2 to 4 bits are needed (4 to 16 different profiles per MS). If the headers do not have such redundant bits, the headers can be extended, or the profile tag PrT can be appended to the payload part PL.

Figure 3:
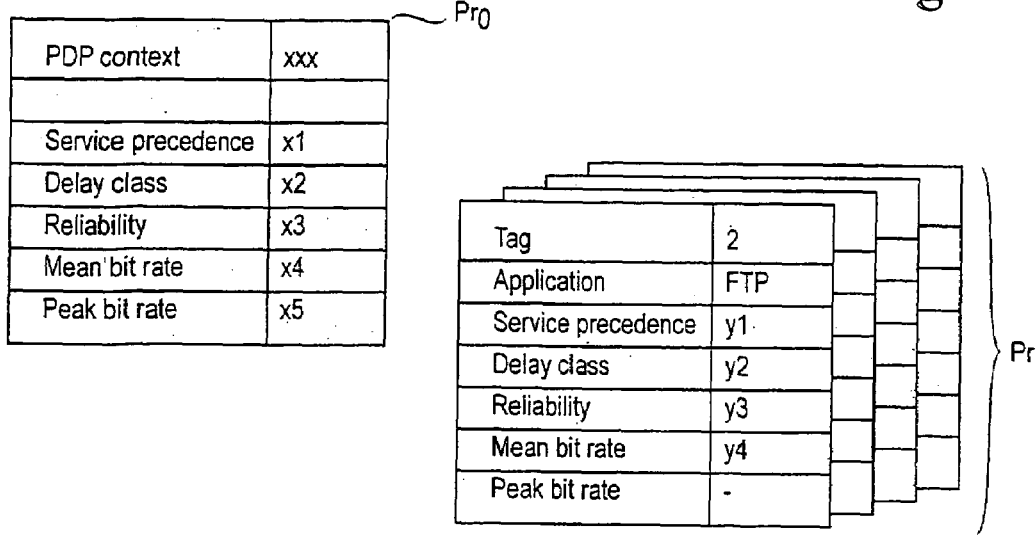
FIG. 3 illustrates a preferred arrangement of multiple profiles within a single PDP context.

FIG. 3 illustrates the hybrid profile concept of the invention. For each PDP context, there is an MS-specific and/or a PDP context-specific default profile $Pr_0$ which provides default values for some or all of the QoS parameters. For each application, application type or flow associated with the MS, there may be a separate profile Pr. The separate profiles Pr are associated with the PDP context so that a profile tag with a small number of bits (e.g. 2 to 4 bits) is sufficient to indicate the relevant profile Pr. FIG. 3 shows one such profile, having an identifier of 2 and relating to an FTP application. For this application, there are separate values for service precedence (y1), delay class (y2), reliability (y3) and mean bit rate (y4). However, no values are defined for the peak bit rate and hence the default value (x5) of the default profile $Pr_0$ will be used.

The QoS information associated with the profile indicated by the PrT is employed in various nodes in the GPRS system for scheduling and policing the transmission of the data packets. As noted above, in the present GPRS specifications, QoS is associated with the PDP context, which causes the various problems described above. According to the present invention, each data packet DP comprises a profile tag PrT whereby the scheduling and policing can be performed on a packet by packet basis (depending on the flow). More particularly, the profile Pr associated with each data packet DP indicates at least one QoS parameter, and the scheduling and the policing of the transmission of the data packets is made on a packet by packet basis according to this QoS parameter indicated by the profile, while, however, within a "transmission tunnel" defined by the PDP context, if such a default is defined for the PDP context in question.

Figure 2:
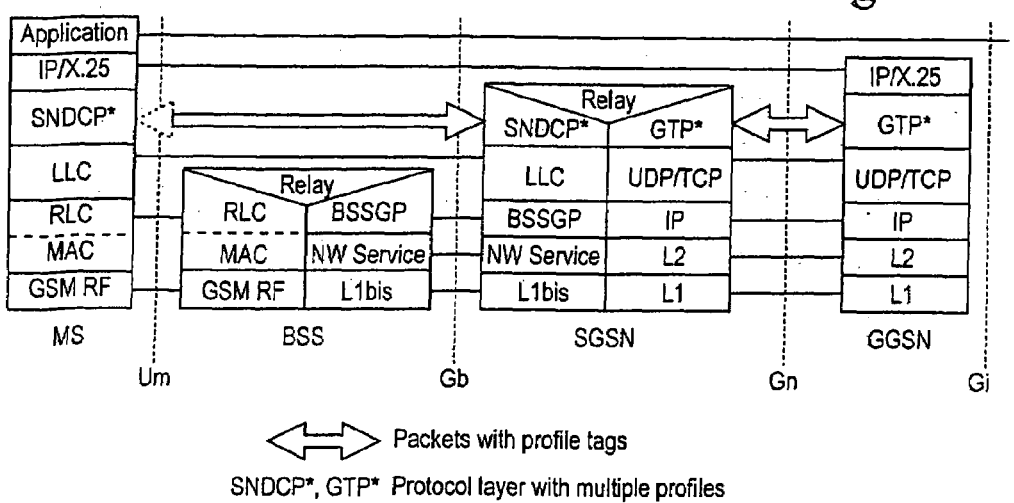
FIG. 2 illustrates a GPRS transmission plane and the use of the profile tags according to the invention.

According to a preferred embodiment of the invention, the QoS information associated with the profile indicated by the profile tag includes at least priority information and a delay class information, and optionally, reliability information. The delay class information has two or more values indicating the importance of the packet and thus it also defines the order in which data packets should be handled in case of network congestion. The priority information may also define a Nominal Bit Rate as in the SIMA approach, or indicate the discarding order of packets/flows. In addition to optionally having mean and peak bit rates in the profiles, this preferred embodiment of the invention requires typically the following modifications to GPRS specifications:

1) As shown in FIG. 2, SNDCP and GTP headers should carry additional bits for transmitting a profile tag (GTP bits are needed on both directions, SNDCP bits could in certain cases be used only for uplink data). In addition, IPv4's Type-of-Service field or IPv6's priority field or Traffic Class field could be used in the GPRS backbone if IP routers etc. should also support prioritisation of packets and QoS-based queuing or scheduling. RSVP could also be used within the GPRS backbone for providing specific flows with independent QoS handling. IPv6 traffic flows may be established for transmitting data belonging to certain traffic types. It is also feasible that no extra bits be allocated in the GTP headers, but the profile information is carried by lower layers. For example, if the underlying GPRS backbone network supports such mechanisms, this information can be included in an IP header or some other lower layer protocol header. This being the case, the SGSN and the GGSN should be capable of recovering this lower layer information in order to reuse it. The profile tag can be added to data packets at the Gb interface as well, e.g. to BSSGP protocol messages. Then the QoS information can be mapped to Frame Relay or ATM concepts at SGSN and BSS.

2) In prior art system, a PDP context has a single QoS profile using a single SAPI. Several PDP contexts could use the same SAPI if their QoS profiles are similar. According to the invention, a single PDP context can use several SAPIs. The flows using the same SAPI should have similar QoS reliability is used as one of the QoS parameters). In other words, the SNDC layer should be capable of multiplexing NSAPI on several SAPIs according to the QoS profile information at the LLC layer, as will be described in more detail below.

No modifications are necessarily needed in the lower radio interface protocols, like RLC. However, radio interface protocols could be replaced later with newer protocols, such as Wideband CDMA (WCDMA). The present invention is applicable also in such a case and similar QoS support (prioritisation, traffic type/delays) to the one described herein could inherently be implemented into those radio protocols.

Figure 4:
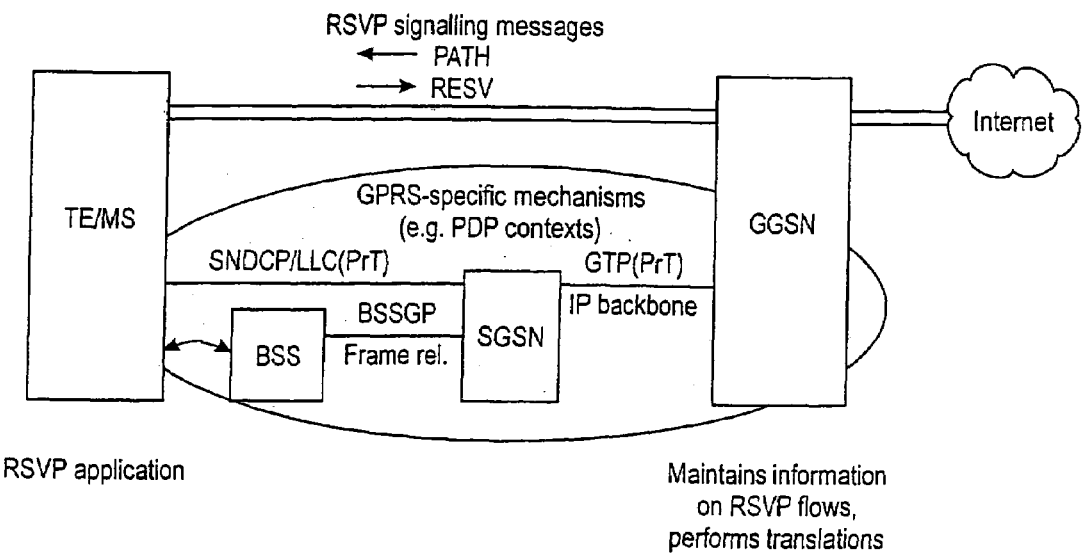
FIG. 4 illustrates interworking between different network elements.

FIG. 4 illustrates interworking between different network elements. After these modifications, a parameter-level mapping between differentiated services in the Internet and in GPRS may be provided as follows, for example:

Priority information in the Internet is mapped to service precedence in GPRS.

An indication concerning real-time vs. non-real-time requirements in the Internet is mapped to delay class and/or reliability information in GPRS: at least two delay types are needed, but mapping of traffic types more precisely to several delay classes is also possible.

Reliability information may be used to indicate the reliability requirements of each application in the form of one of at least two reliability classes. If reliable transmission (retransmissions, checksums and/or TCP) is needed, the profile associated with the data packets indicates reliability class 1. If reliable delivery over the radio interface is needed, but UDP in the GPRS backbone is sufficient, the profile associated with the data packets indicates reliability class 2. Depending on the requirements, the profile associated with the data packets may alternatively indicate reliability class 3, 4 or 5. Reliability classes 4 and 5 will be used for real-time traffic.

A further feature of the present invention may be a mapping of the QoS parameters used in the mobile-communication network to those used in a user application in the mobile packet data terminal or those used in the external communication system, and vice versa. The mapping is made for each packet entering or leaving the mobile communications system. In the following, two examples of the mapping will be given.

EXAMPLE 1

Simple Integrated Media Access (SIMA) is a new simple approach presented as an Internet-Draft by K. Kilkki, Nokia Research Center, June 1997. Internet-Drafts are working documents of the Internet Engineering Task Force (IETF), its areas, and working groups. SIMA is used as an example of an Internet QoS scheme because it is capable of providing a uniform service concept for different needs from file transfer applications using TCP/IP protocol without loose delay and packet loss requirements to real-time applications with very strict quality and availability requirements. According to the SIMA concept, each user shall define only two issues before the connection setup: a nominal bit rate (NBR) and the selection between real-time and non-real-time service classes. The NBR may have eight values 0 to 7. Mapping of parameters from SIMA to GPRS and vice versa may be as follows, for example:

Real-time/non-real-time bit: if this bit indicates real-time require-ments, it is mapped to GPRS delay class 1, otherwise it is mapped to delay class 4. However, delay class 3 may be used for non-real-time services in case there is a special way to indicate best-effort traffic, e.g. this bit does not always have to be present, or a more precise definition is used to differentiate real-time, non-real-time, and best-effort traffic. A lower Reliability Class value may be assigned to real-time traffic than to non-real-time traffic in GPRS. Generally, Reliability classes 1, 2, and 3 are usually used for non-real-time traffic and classes 3, 4, and 5 for real-time traffic in GPRS. For non-real-time traffic, the higher the NBR is, the lower is the Reliability Class value suitable for transmission.

| NBR values | GPRS service precedence value |
|---|---|
| 6 and 7 | 1 |
| 3, 4, and 5 | 2 |
| 0, 1, and 2 | 3 |

It should be noted that the Service precedence and the Delay class parameters have here a somewhat different meaning from the current GPRS specifications, where those parameters are associated with PDP contexts, not with each application. Thus, different names, such as priority or Nominal Bit Rate and traffic type, may also be chosen for the parameters. The QoS Profile may include all the existing parameters (service precedence, reliability class, delay class, mean bit rate and peak bit rate). Alternatively, it could only include part of the parameters, such as only the mean and peak bit rate. The QoS Profile could also include a maximum burst size parameters to ease buffer allocation procedure.

QoS scheduling in GPRS network elements (e.g. in an SGSN and a GGSN) is based on the delay class. This requires that at least two buffers exist (and at most as many as there are different delay classes): one for real-time packets (this buffer should be much smaller!) and another for non-real-time packets. Real-time traffic should always be sent before non-real-time traffic. Service precedence defines the order in which packets can be dropped in case of network congestion.

EXAMPLE 2

Mapping a Type of Service (ToS) octet in the headers of IP PDUs to GPRS attributes. The ToS octet in an IP header is not widely used at the moment. Its original purpose was to include traffic type information and to specify what kind of service is required from the packet delivery. Because the ToS octet is not in common use nowadays, it is possible to redefine the bits in that octet for the purposes of the present invention. A definition of the ToS octet is given in RFC 791 Bits 0 to 2 of ToS give the preference, bits 3 to 5 give the ToS required by the packet (e.g. delay, throughput, and reliability levels requested), and bits 6 to 7 are reserved for future use. RFC 1349 extends the ToS field by one bit (taken from the "reserved for future" bits). Thus, 4 bits can be used to indicate a ToS.

Mapping between the precedence bits (0 to 2 in ToS) and GPRS service precedence may be as follows:

| bit values (0 to 2) | service precedence value |
|---|---|
| 111 and 110 | 001 (highest priority) |
| 101, 100, and 011 | 010 (normal priority) |
| 010, 001, and 000 | 011 (lowest priority) |

There are three different ways to perform the mapping between the traffic type information (i.e. ToS field in the ToS octet) and the GPRS delay class:

If only the bit 3 in the ToS field is used to indicate the delay requirements in IP header: value 0 of bit 2 is mapped to GPRS delay class 2 and value 1 of the bit 2 is mapped to GPRS delay class 4 (best effort).

If the whole ToS field in ToS is used for indicating delay requirements, i.e. 4 bits (bits 3–6) are available for that purpose, one possible mapping could be: bit value 1000 is mapped to GPRS delay class 1 (i.e. to bit value 000), bit value 0100 to GPRS delay class 2 (i.e. to value 001), ToS values 0010 and 0001 to GPRS delay class 3 (i.e. to value 010), and the ToS value 0000 to GPRS delay class 4 (i.e. to value 011).

Another way of mapping the IP's ToS bits to GPRS delay classes would be: 11x to delay class 1, 1 x to delay class 2, 01x to delay class 3, and 00x to delay class 4. In this case, x means that there might be one or more additional bits used for ToS, but they do not have any impact on the process of selecting the GPRS delay class. If more delay classes are defined for GPRS later, the mapping could also take into account those additional bits.

Currently there is also one bit in the IP ToS field specifying the desired reliability level. If this bit is still available in the future, e.g. if the first choice above is chosen, this bit could carry reliability information and could be mapped to GPRS reliability class in the following way: a value 0 in bit 5 inside the ToS octet is mapped to the reliability class 000 (subscribed reliability class) and a value 1 is mapped to the reliability class 001 (defining the most reliable service). The use of that bit may, however, be too vague because the GPRS defines many other reliability levels as well and this cannot be expressed using only one bit.

The mapping described above in Example 2 may be applied in a rather similar way in IPv6. The name of the appropriate field is then Traffic Class instead of ToS.

FIG. 4 illustrates the operation of a GPRS mobile station and GPRS network elements, as well as integration with external network QoS concepts, when the inventive multiple QoS concept and profile tag are employed. The MS, or more precisely, the software in the terminal equipment TE (e.g. in a laptop computer), and the GGSN, provide mapping of external network QoS requirements to GPRS QoS mechanisms, and vice versa, as described in the above examples. The TE could for example provide QoS functions through an Application Programming Interface (API). The application-level software may insert into the data packets, e.g. inside the IP header itself, the QoS information or a profile tag, or it can indicate the correct flow which the packet belongs to using some other suitable means. It can also use the RSVP to convey the necessary information via appropriate mapping layers to lower layers. If it performs none of these operations, the GPRS-specific software should provide the data packets with a profile tag indicating priority and traffic type information, based on available information. The software may, for example, decide the QoS profile based on the used source and destination IP addresses, or on the source and destination port numbers.

For Mobile Originated (MO) data, the MS schedules data packets based on the QoS information (e.g. a profile tag) received from the application or from the GPRS protocol suite in the Terminal Equipment. The MS schedules the incoming MO packets according to their delay class. In the SNDC layer, the MS selects the appropriate LLC SAP (Service Access Point) as indicated by the SGSN during PDP context activation or modification.

Figure 5:
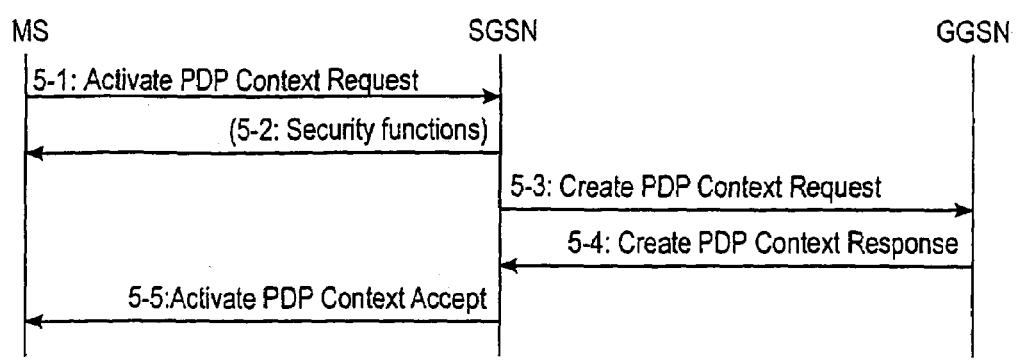
FIG. 5 shows a context activation procedure.

FIG. 5 shows a context activation procedure. In step 5-1, the MS sends an Activate PDP Context Request (comprising an NSAPI, a PDP type, a PDP address, an Access Point Name, the requested QoS Profiles and an associated Profile Tag PrT, an Interworking parameter and its associated PrT, and PDP configuration options) to the SGSN. Security functions may be performed in step 5-2, but they are not relevant for understanding the invention. In step 5-3, the SGSN validates the request 5-1. The SGSN creates a Tunnel Identifier TID for the requested PDP context. The SGSN may restrict the requested QoS attributes given its capabilities, the current load, and the subscribed QoS profile. Next, in step 5-3, the SGSN sends a Create PDP Context Request (comprising a PDP type, a PDP address, an Access Point Name, the negotiated QoS Profiles and an associated PrT, an Interworking parameter and its associated PrT, the TID, and PDP configuration options) to the GGSN. The GGSN may also restrict the requested QoS attributes given its capabilities, and the current load. In step 5-4, the GGSN returns a Create PDP Context Response (comprising a TID, a PDP Address, the negotiated QoS Profiles with profile tags PrT, and PDP configuration options) to the SGSN. The SGSN inserts the NSAPI with the GGSN address in the PDP context. Next, in step 5—5, the SGSN selects a Radio Priority Level based on each negotiated QoS profile, and returns an Activate PDP Context Accept (comprising a PDP type, a PDP Address, an NSAPI, the negotiated QoS Profiles with associated profile tags PrT, a Radio Priority Level and an SAPI for each QoS profile, Interworking parameter and its associated PrT, and PDP configuration options) to the MS. Now the SGSN is able to route PDP PDUs between the GGSN and the MS. The SAPI indicates which QoS profile uses which SAPI.

Figure 6:
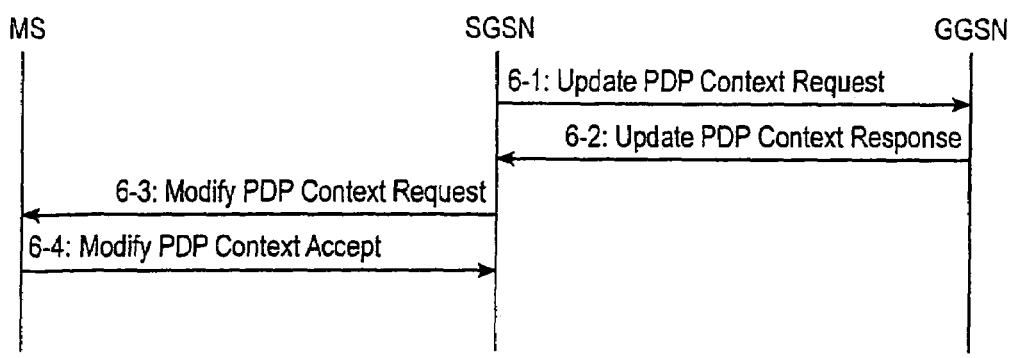
FIG. 6 shows a context modification procedure.

FIG. 6 shows a context modification procedure. In step 6-1, the SGSN sends an Update PDP Context Request (comprising the TID, the negotiated QoS Profiles and an associated PrT, an Interworking parameter and its associated PrT) to the GGSN. This message is used to add, modify or cancel a QoS profile of a PDP context. If the GGSN receives from the SGSN a negotiated QoS which is incompatible with the PDP context being modified (e.g. the reliability class is insufficient to support the PDP type), the GGSN rejects the request. Compatible QoS profiles are configured by the GGSN operator. The GGSN may again restrict the requested QoS attributes given its capabilities, and the current load. The GGSN stores the negotiated QoS values and, in step 6-2, returns an Update PDP Context Response (comprising the TID, the negotiated QoS Profiles and an associated PrT, an Interworking parameter and its associated PrT) to the SGSN. Next, in step 6-3, the SGSN sends a Modify PDP Context Request (comprising an NSAPI, the negotiated QoS Profiles with associated profile tags PrT, a Radio Priority Level and an SAPI for each QoS profile, Interworking parameter and its associated PrT) to the MS. In step 6-4, the MS acknowledges by returning a Modify PDP Context Accept message. If the MS does not accept the negotiated QoS Profiles, it can de-activate the corresponding PDP context(s) using a PDP Context Deactivation procedure.

The choice whether to use retransmission or checksums at the LLC/RLC level depends on the reliability class of the corresponding profile. The reliability class defines either acknowledged or unacknowledged service of LLC, RLC and GTP. Scheduling in the lower layers is performed in accordance with the delay class of the corresponding profile.

The MS may also perform policing of the negotiated PDP context attributes of the QoS profile. It may drop non-conforming packets (or change the service precedence (i.e. the priority) of those packets to the worst possible, i.e. to indicate best-effort). Not only the MS, but also an SGSN may optionally perform traffic policing according to the negotiated QoS profile or PDP context level attributes. Network nodes may police the throughput levels and the used delay classes, reliability classes and service precedence values. Values negotiated for the PDP context may be interpreted as maximum allowed values or default values for the profiles. PDP context or profile-dependent QoS attributes form the basis for charging. For example, there could be a different counter associated with each profile used to charge the user.

The LLC establishes a connection over a SAPI when a new QoS profile is activated, requiring a new SAPI. This may happen at PDP context activation or modification (e.g. a creation of a new QoS profile). When all (QoS profile) flows using the SAPI are released, the LLC connection over this SAPI will also be released. Different QoS profiles can be employed between the MS and the SGSN. For example, the same SAPI could be used if the mean throughput is different but not if the delay class is different. Then the LLC/SNDCP layer has to multiplex several NSAP is of one user onto several SAPIs in the MS and SGSN. The LLCISNDCP layer in an SGSN decides, based on the QoS profile, which SAPI it will use to transfer the packets in a certain flow. The SNDC layer adds the corresponding profile tag to the data packets. It can perform segmentation of SN-PDUs as usual. Then the SNDC layer gives the packet to the LLC layer using the appropriate SAPI. The LLC layer transmits the packet over the LLC/radio connection as usual. At the other end, the SNDC layer receives packets from the different LLEs and associates them with the correct NSAPIs and further to the corresponding profiles based on the profile tags. Maintaining the order of the packets using different QoS values/profiles is not essential because packets using different QoS either belong to different-application-level connections or are reordered according to their QoS values, which is the purpose of having the QoS values in the first place.

The SGSN reads the QoS information, i.e. the service precedence, the delay class, the mean and peak bit rates, and the reliability class, of the profile associated with the uplink SNDCP packet, and schedules the packets based on this QoS profile. There may be different buffers for each allocated delay class. The lower the delay class is, the smaller the size of a buffer allocated for queuing the concerned packet class should be. This is because some packets are delay-sensitive, and thus cannot cope with long queuing delays. Lower delay classes are normally sent before any higher delay class packets. Each buffer, i.e. a queue, may have a threshold value defined. When this threshold value is exceeded, the incoming packets (of the concerned class) having a low service precedence value may be discarded. An SGSN may maintain both reliable and unreliable paths to GGSNs. These paths might be dedicated to a certain user/profile, or, alternatively, several users and profiles might be multiplexed onto the same paths. The right path for delivering each data packet is selected based on the reliability class information included in the profile, or based on default values if there is not enough information in the corresponding profile to make a decision. A reliable connection-oriented path is chosen for reliability class 1, and a connectionless path for other reliability classes. The SGSN adds a profile tag to GTP headers. This information may be included in the 10th, 19th, or the 20th octet of the header (currently reserved for future use).

The GGSN recovers the profile tag from the uplink GTP header. It may also perform traffic policing. The GGSN may perform charging functions and it may utilise the QoS information relating to the profile for that purpose too. The GGSN, or an external host, may provide a mapping between the external data network QoS definitions and the GPRS QoS, and vice versa. This applies both to uplink and downlink data delivery.

The same procedure applies to Mobile Terminated (MT) data packets only the direction of transmission is reversed. In this case, the GGSN selects the appropriate QoS profile and GTP path. The SGSN looks inside the downlink GTP header in order to find the profile tag and it deduces the QoS information from its local profile record. The SGSN also adds the profile tag to downlink SNDCP packets, makes the scheduling based on the delay class of the flow/profile, and uses the correct LLC SAPI associated with the profile. The Mobile Terminal may change the application's IP header in order to inform the Terminal Equipment (TE) of the QoS of the downlink data packet. Alternatively, the MS might use some GPRS or PPP specific mechanisms for delivering the same information to the TE. Scheduling and policing operations inside the network elements are basically the same in both directions.

As noted above, for uplink data, the GGSN, or an external host, modifies the GPRS QoS information to the QoS concepts available in the external packet data network. Similarly, for downlink data, the GGSN, or an external host, should translate the external network QoS into the GPRS QoS definitions in each data packet. The GGSN, or an external host, may optionally maintain information about different application connections and traffic flows, but this is not required. The flow information can be obtained for example via RSVP signalling in the network. The GGSN, or an external host, may response to external RSVP messages itself, or it may also pass the RSVP messages to the MS which may take part in the RSVP signalling. The capacity indicated in RSVP response messages should be in line with the capacity reserved for the corresponding QoS profile in the GPRS network.

As described in the examples above, the Differentiated Services in the Internet, like the SIMA approach, can be mapped quite easily to these new GPRS QoS concepts. For Differentiated Services, a separate QoS profile could be established for each traffic type (i.e. attribute combinations, per-hop behaviours) requiring a particular service from the network. The Integrated Services are usually associated with traffic flows, which can be mapped to different QoS profiles within the GPRS. The Guaranteed Service can thus be defined as with the RSVP: the GGSN, or an external host, and the MS on the other side, may provide the mapping between QoS profiles and external traffic flows, as well as the mapping of QoS parameters. During the RSVP negotiation, the GPRS system may indicate that it cannot support various token bucket sizes or maximum packet sizes. Thus, it may require that those parameters are set to conform to the supported values before it will accept the RSVP reservations. The MS, the SGSN, the GGSN or an external host may also know the free capacity in the network and make a decision on the acceptance of each reservation request based on this information.

Also ATM (Asynchronous Transfer Mode) or X.25 can be used as an external data network or as a transmission medium to convey the GPRS signalling and data traffic. The ATM Constant Bit Rate (CBR) and real-time Variable Bit Rate (r-VBR) traffic may be mapped to real-time traffic class and the other ATM traffic classes to non-real-time traffic. Priority may be decided based on both the used traffic class (non-real-time Variable Bit Rate, Alternative Bit Rate, or Unspecified Bit Rate) and other connection-related parameters, such as mean and maximum bit rates.

IP networks will be used as an underlying transmission network in the GPRS backbone. The GPRS QoS concepts may be mapped to the Type-Of-Service parameter in the IPv4, or to the Priority/Traffic Class field in the IPv6, and vice versa. The flows in the IPv6 can also be used to reserve certain capacity and to handle certain traffic types, application connections, or PDP contexts. If the external Internet network also employs these methods, the GGSN, or an external host, could perform mapping of concepts similarly between the GPRS network and the Internet.

The present invention is applicable in any mobile communications network, substantially as described above with respect to the GPRS. Potential mobile networks in which the principles of the present invention may be applied are the third generation mobile communications systems, such as the Universal Mobile Communications System (UMTS) and the Future Public Mobile Telecommunication System (FPLMTS), or IMT-2000, or the Cellular Digital Packet Data (CDPD).

The description only illustrates preferred embodiments of the invention. The invention is not, however, limited to these examples, but it may vary within the scope of the appended claims.

What is claimed is:

1. A method for transmitting data packets in multiple data flows to/from a mobile station in a mobile communications system having a packet data transmission capability, the method comprising:
    setting up a data transmission path for the mobile station for routing data packets through the mobile communications system;
    transmitting data packets through the mobile communications system between said mobile station and an external communication system;
    associating multiple profiles with the data transmission path, each profile comprising several quality parameters;
    providing each of said multiple data flows with a profile tag indicating one of the multiple profiles associated with the data transmission path in question; and
    scheduling and policing the transmission of individual data packets on the basis of said several quality parameters of the profile indicated by the profile tag associated with each of the data flows in question.

2. A method according to claim 1, further comprising:
    executing at least two applications in said mobile station, each application belonging to a class/type and having at least one flow associated thereto;
    transmitting, within a single transmission path, data packets of said at least two applications; and
    providing each flow of each application class/type with a profile tag indicating each quality parameter required by the respective application class/type.

3. A method according to claim 2, further comprising providing each flow of each individual application with a profile tag.

4. A method according to claim 1, further comprising providing each of several individual data packet with a profile tag.

5. A method according to claim 1, providing, as quality parameters, each profile with priority information indicating one of at least two priority levels.

6. A method according to claim 1, further comprising:
    providing in the mobile communications system at least one connection leg with at least two paths having different reliabilities;

providing, as one quality parameter, each profile with reliability information indicating one of at least two reliability classes; and multiplexing the data packets to said at least two paths according to said reliability information.

7. A method according to claim 1, further comprising:

forming in the mobile communications system at least one connection leg with a connection-oriented path and a connectionless path, the former being more reliable than the latter; and deciding whether to send a data packet over the connection-oriented path or the connectionless path on the basis of said reliability information.

8. A method to according claim 7, further comprising multiplexing data packets associated with two or more profiles to said connection-oriented and connectionless paths in said at least one connection leg.

9. A method according to claim 1, wherein at least one of the profiles comprises at least one further quality parameter indicating a further limit for said scheduling and policing.

10. A method according to claim 9, wherein said at least one further quality parameter includes one or more of the following: mean bit rate, peak bit rate, service precedence, delay class and reliability.

11. A method according to claim 1, wherein:

said at least one further quality parameter defines a mean bit rate;

the actual mean bit rate used by the mobile station is monitored; and data packets to/from the mobile station are discarded, or at least their precedence is lowered if the actual mean bit rate exceeds the mean bit rate defined by said at least one further quality parameter.

12. A method according to claim 1, further comprising mapping quality parameters used in the mobile communications system to those used in a user application in said mobile station or to those used in said external communication system, and vice versa.

13. A method according to any claim 2, further comprising:

establishing one default profile which is associated with said data transmission path, and a specific profile for each application or application class/type being executed in the mobile station; and reading a quality parameter from the default profile if the corresponding quality parameter is missing from the specific profile in question.

14. A method according to claim 1, further comprising associating a packet data protocol context known per se with the data transmission path.

15. A method according to claim 13, further comprising associating said multiple profiles with said packet data protocol context.

16. An apparatus for transmitting data packets in multiple data flows in a mobile communications system having a packet data transmission capability, the apparatus being arranged to:

set up a data transmission path for the mobile station for routing data packets through the mobile communications system;

transmit data packets through the mobile communications system between said mobile station and an external communication system;

associate multiple profiles with the data transmission path, each profile comprising several quality parameters;

provide each of said multiple data flows with a profile tag indicating one of the multiple profiles associated with the data transmission path in question; and schedule and police the transmission of individual data packets on the basis of said several quality parameters of the profile indicated by the profile tag associated with each of the data flows in question.

17. An apparatus according to claim 16, wherein the apparatus is or comprises a mobile radio station.

18. An apparatus according to claim 16, wherein the apparatus is a support node of a packet radio network.

* * * * *